(12) United States Patent
Homburg, Jr. et al.

(10) Patent No.: US 6,793,478 B2
(45) Date of Patent: Sep. 21, 2004

(54) FEMALE VACUUM FORMING APPARATUS FOR FORMING DEEP DRAW PARTS

(75) Inventors: Frederick James Homburg, Jr., Woodhaven, MI (US); Robert Kurbel, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 162 days.

(21) Appl. No.: 09/949,517

(22) Filed: Sep. 7, 2001

(65) Prior Publication Data

US 2003/0047846 A1 Mar. 13, 2003

(51) Int. Cl.[7] .............................................. B29C 51/08
(52) U.S. Cl. ...................... 425/388; 425/403; 425/395; 425/416; 264/553
(58) Field of Search ................................ 425/388, 394, 425/395, 387.1, 403, 398, 416; 264/544, 549, 550, 553, 554, 291, 292

(56) References Cited

U.S. PATENT DOCUMENTS

| | | | |
|---|---|---|---|
| 4,447,200 A | * | 5/1984 | Weisner et al. ............. 425/388 |
| 4,923,539 A | | 5/1990 | Spengler et al. ............. 156/79 |
| 5,076,880 A | * | 12/1991 | Spengler et al. ............. 425/419 |
| 5,217,563 A | * | 6/1993 | Niebling et al. ............. 425/557 |
| 5,972,278 A | | 10/1999 | Ito et al. ..................... 264/510 |

FOREIGN PATENT DOCUMENTS

| | | |
|---|---|---|
| DE | 19 58 110 | 5/1971 |
| GB | 2 148 850 A | 6/1985 |
| JP | 11-321345 * | 5/2001 |

OTHER PUBLICATIONS

Copy of European Search Report for EP 02 25 4554 dated Jan. 8, 2003.

* cited by examiner

Primary Examiner—Robert Davis
Assistant Examiner—Thu Khanh T. Nguyen
(74) Attorney, Agent, or Firm—Brinks Hofer Gilson & Lione

(57) ABSTRACT

A female mold vacuum forming apparatus and a method for using the female mold vacuum forming apparatus for providing improved draw depth capability. The female mold vacuum forming apparatus comprises a top contoured surface and a cavity having a cavity surface formed within the top contoured surface. The cavity surface defines part geometry having deep-draw sections. The top contoured surface defines open sections in the side surfaces of the mold adjacent to at least one deep-draw section to allow free formation of parts within said at least one deep-draw section.

14 Claims, 4 Drawing Sheets

FEMALE VACUUM FORMING APPARATUS FOR FORMING DEEP DRAW PARTS

BACKGROUND OF THE INVENTION

The present invention generally relates to female vacuum forming apparatus. In particular, the present invention relates to a female vacuum forming tool that provides improved draw depth capability for forming parts such as automotive instrument panel covers.

Existing female vacuum forming apparatus comprises a porous female cavity having small air canals, a male portion called a plug, and a clamp frame. A sheet of thermoplastic material is loaded into the clamp frame and heated to its softening point wherein it begins to sag. The sheet is then placed in between the female cavity and plug. The plug lowers to assist in pushing portions of the sheet in close proximity to the surface of the female cavity. Vacuum pressure is then used to pull the sheet against the surface of the female cavity.

In order to form a vacuum, current design standards dictate that the female cavity be enclosed and that the female portion of the tool, the male plug, and the clamp frame mate at a point near the top of the part shape. In a case where a part has a deep V-shaped cross-section, but is otherwise open on its ends, the corresponding female tool contains large sections called run-off areas which serve to enclose the tool cavity. The run-off areas are not used to form actual part shape. During the conventional forming process, portions of the sagging sheet contact these run-off areas and begin to cool more quickly than areas of the sheet not yet in contact with the female tool. As the sheet cools, the thermoplastic material loses its stretching properties. This can inhibit stretch into a deep draw section adjacent to the run-off areas, resulting in thin-walled sections or rupture of the sheet.

BRIEF SUMMARY OF THE PREFERRED EMBODIMENT OF THE INVENTION

The present invention addresses these problems by providing a tool with increased deep draw capabilities by decreasing contact with areas of the tool that do not contain part shape. The present invention does not require that the female cavity be enclosed completely around the tool. Instead, the profile of the tool more closely conforms with the shape of the part, reducing the run-off sections and leaving open sections in the female cavity. Open sections in the tool allow the thermoplastic sheet to sag in open air without cooling against cooler run-off areas. When the tool eventually seals with the male plug and the vacuum pressure is drawn, the thermoplastic sheet can be stretched more effectively into the deep draw section.

Briefly stated, in accordance with one aspect of the present invention, a female mold vacuum forming apparatus is provided having a top contoured surface and a cavity formed within the top contoured surface. The cavity has a cavity surface which contains air canals. The cavity surface also defines part geometry having deep draw sections. The top contoured surface defines open sections in the side surfaces of the mold adjacent to at least one of the deep draw sections to allow free formation of parts within the deep draw sections.

In accordance with another aspect of the present invention, a female mold vacuum apparatus is provided comprising a cavity and a cavity surface having air canals. The cavity surface also defines part geometry having deep draw sections. An open section is defined within a side surface of the mold adjacent to at least one deep draw section to allow unhindered formation of parts within the deep draw section.

In accordance with yet another aspect of the invention, a method for vacuum forming thermoplastic parts is provided. In the first step, a female mold is provided having a cavity and cavity surface with air canals. Open sections are defined in the side surfaces of the mold to allow free formation of parts within deep draw sections. A softened thermoplastic sheet is then lowered into the cavity wherein the sheet does not contact the mold at the open sections. Air is then drawn through the air canals wherein negative pressure is created at the cavity surface.

DETAILED DESCRIPTION OF THE INVENTION

Figure 1:
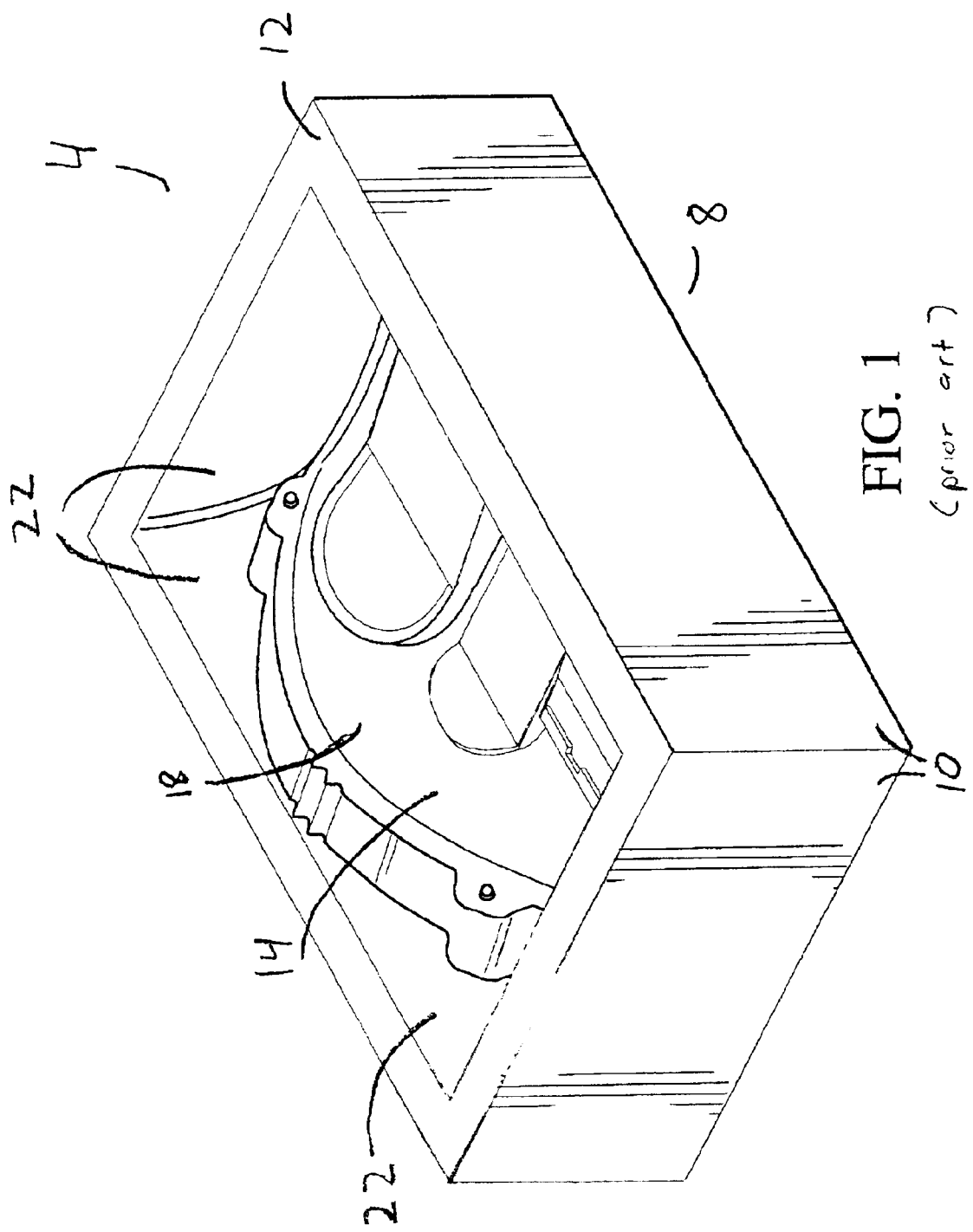
FIG. 1 is a perspective view of a female vacuum forming mold of the prior art.

FIG. 1 shows a typical prior art female vacuum forming mold 4 for vacuum forming of a thermoplastic material. The mold 4 is generally box shaped having a bottom 8, four sides 10, and a top surface 12, wherein the top surface 12 is substantially planar. The mold defines a cavity 14 wherein the three dimensional contour of a part, referred to as part geometry 18, is formed into the cavity 14. Areas of the cavity 14 that do not contain part geometry 18 are called run-off sections 22. The run-off sections 22 are typically located between the part geometry 18 and the top surface 12. When a heated thermoplastic sheet 24 (shown for example in FIG. 2) enters the cavity 14, the sag 28 of the sheet 24 contacts the run-off sections 22 and begins to cool, inhibiting stretching of the sheet 24 into deep draw areas.

Figure 2:
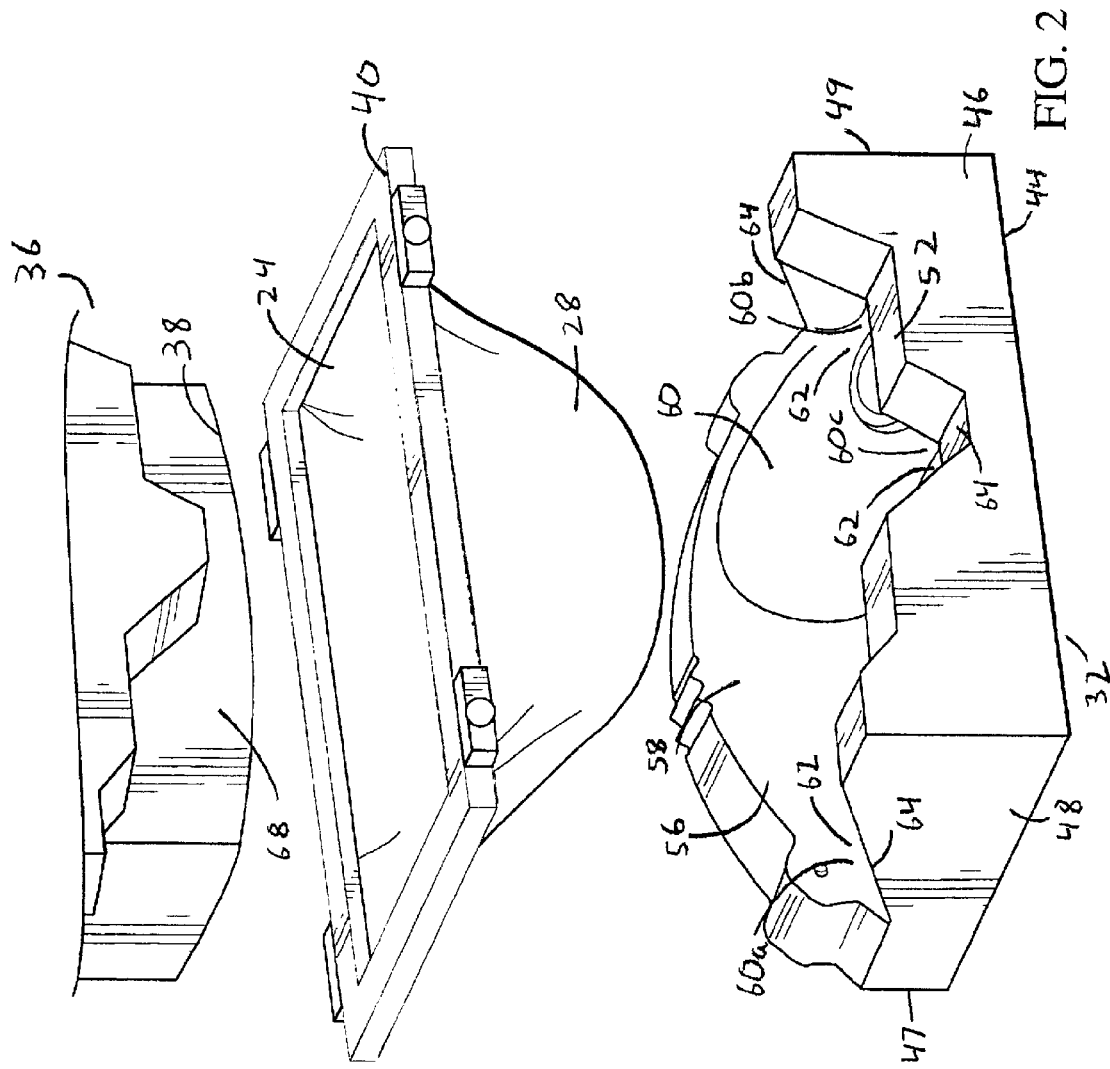
FIG. 2 is a perspective view of the female vacuum forming apparatus of the present invention.
Figure 3:
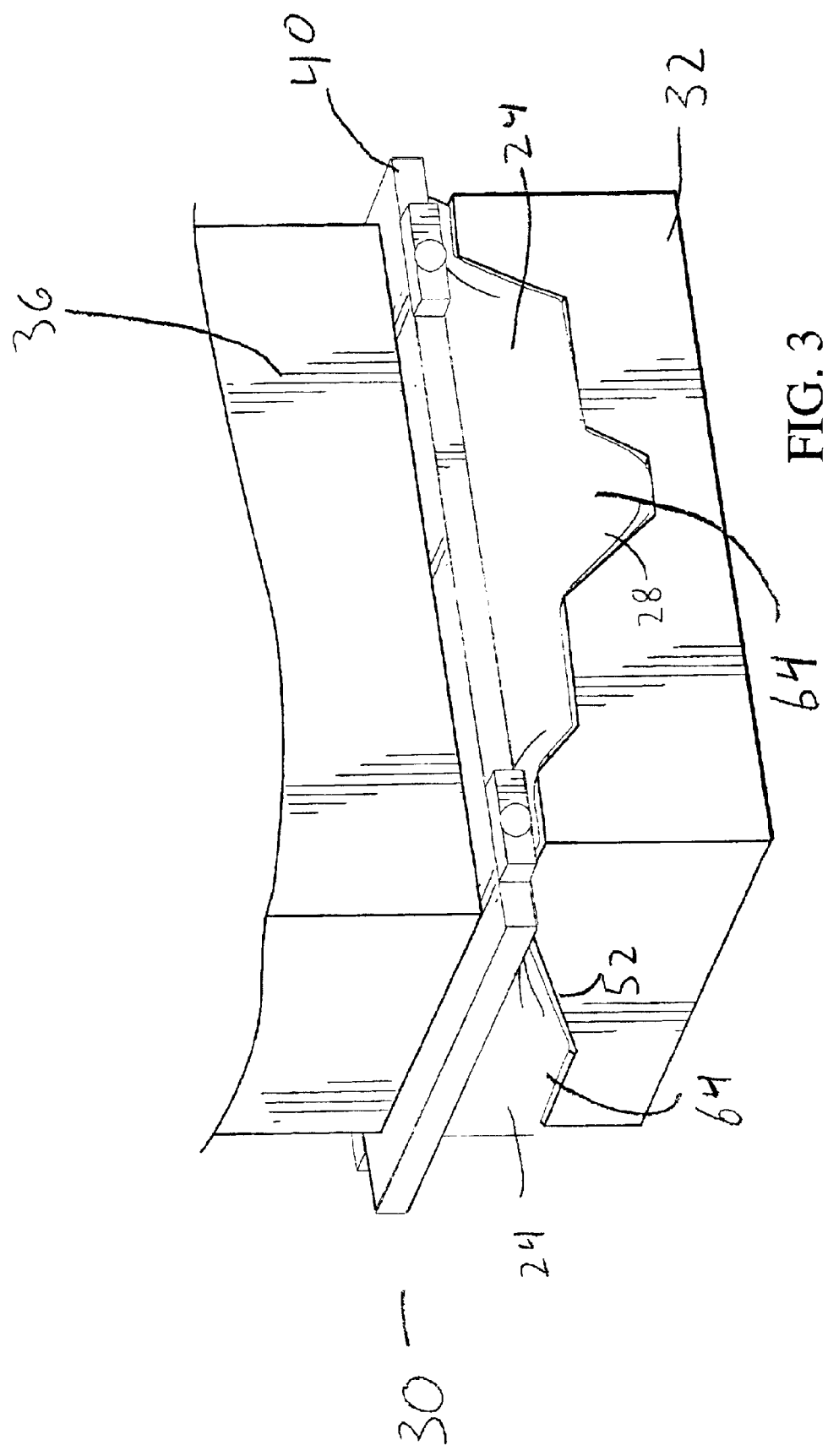
FIG. 3 is a perspective view of the female vacuum forming apparatus of the present invention in operation.
Figure 4:
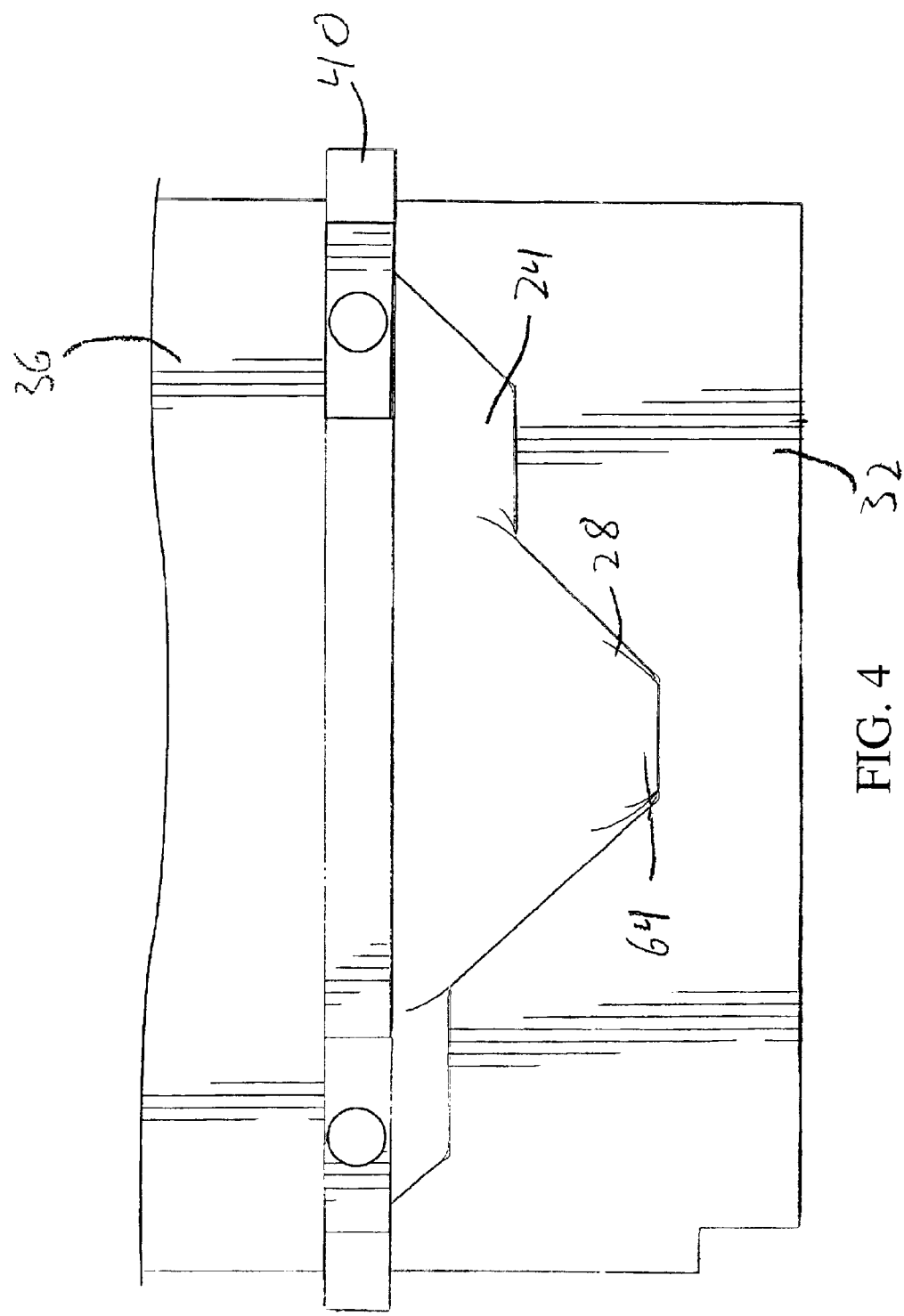
FIG. 4 is a front view of the female vacuum forming apparatus of FIG. 3.

FIGS. 2–4, show a female vacuum forming apparatus 30 utilizing the present invention. The female vacuum forming apparatus 30 comprises a female mold 32, a plug 36, and a clamp 40. The mold 32 is generally box-shaped and comprises a bottom 44, a front 46, a back 47, a left side 48, a right side 49, and a top contoured surface 52. Within the top contoured surface 52, the mold 32 also defines a cavity 56 having a cavity surface 58. Part geometry 60 is formed into the cavity surface 58. The cavity surface 58 also defines a plurality of small air canals (not shown) which are adapted to draw air from the cavity 56 and create a vacuum proximate to the cavity surface 58. In the preferred embodiment, the cavity surface 58 is made of porous material, such as nickel or aluminum.

The part geometry 60 dictates the depth and shape of the cavity 56. Deep-draw sections 62 may result in the mold 32 where the part being formed requires the thermoplastic material to stretch over a large distance, causing thin walls or rupture of the sheet 24. Deep-draw sections 62 are sections generally having a depth greater than half the length of the longer width of the cavity 56. The depth is measured from the clamp 40 when the clamp 40 is fully lowered in operation. In a preferred embodiment of the present invention shown in FIG. 2, the part geometry 60 defines open ends 60a, 60b and a center v-shaped section 60c. In this embodiment, the part geometry 60 creates deep-draw sections 62 in the mold 32.

The top contoured surface 52 is contoured relative to the part geometry 60 wherein open sections 64 are defined proximate to the deep-draw sections 62 in the mold 32. The open sections allow the sheet 24 to hang freely during operation instead of cooling against the cavity surface 58. The open sections 64 preferably have a depth that is at least one third the depth of the adjacent deep-draw section 62. In the preferred embodiment, the open sections 64 are located at the sides 48, 49 and front 46 of the mold 32.

The plug 36 is adapted to fit within the cavity 56. In the preferred embodiment, part geometry 68 is formed into the bottom surface 38 of the plug to substantially register with the part geometry 60 of the female mold 32.

The clamp 40 is adapted to hold the thermoplastic sheet 24 during the forming operation. The clamp 40 is preferably configured as a frame arranged in a substantially horizontal plane and is generally rectangularly shaped.

In operation, a thermoplastic sheet 24 is loaded into the clamp 40. The sheet 24 is then heated by a radiant heat source (not shown) such as an oven enclosure until the sheet 24 attains the optimal softening point. As the sheet 24 is heated to its optimal softening point, the thermoplastic begins to form a sag 28. The clamp 40 and sheet 24 are then indexed over the mold 32 and the sheet 24 is lowered into the mold 32. The plug 36 is then lowered through the clamp 40 into the cavity 56. The plug 36 contacts central portions of the sheet 24 to bias the sheet 24 into close proximity with the part geometry 60. The plug 36 is also adapted to engage the sheet 24 around the perimeter of the part geometry 60 wherein the plug 36 pushes the sheet 24 against the mold 32 such that an air tight seal is formed around the part geometry 60. A vacuum is drawn in the mold 32 so that negative pressure is created at the cavity surface 58 and the sheet 24 is pulled inwardly toward the cavity surface 58. The sheet 24 is then cooled and removed from the mold 32.

During operation as shown in FIGS. 3 and 4, the sag 28 of the sheet 24 hangs freely in the open sections 64 proximate to the deep-draw sections 62. As a result, the sheet 24 in those areas does not contact the mold 32 and cool against the cavity surface 58. Instead, the open sections 64 allow for free and unhindered formation of parts because the sheet 24 retains its heat and optimal stretching properties until the sheet is drawn against the cavity surface 58.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A female mold vacuum forming apparatus comprising:
   a top contoured surface,
   a cavity formed within the top contoured surface, said cavity having a cavity surface, said cavity surface containing air canals,
   said cavity surface defining part geometry and having at least one deep draw section with a depth greater than one half of the longer width of said cavity,
   said top contoured surface defining open sections in the side surfaces of the mold adjacent to at least one of said deep-draw sections to allow free formation of parts within at least one said deep-draw sections, said open sections define a depth that is at least one third the depth of the adjacent at least one deep-draw section, and
   a clamp adapted to hold the thermoplastic sheet, said clamp engaging said top contoured surface at areas other than said open sections and, when engaged with said top contoured surface, said open sections being spaced apart from and beneath said clamp.

2. The female mold vacuum forming apparatus of claim 1 wherein the cavity surface is made of a porous material.

3. The female mold vacuum forming apparatus of claim 1 wherein said cavity surface defines more than one of said deep draw sections having a depth greater than the length of half the longer width of the cavity.

4. The female mold vacuum forming apparatus of claim 1 further comprising a plug adapted to engage a thermoplastic sheet around said part geometry, wherein during operation the plug, the female mold and the thermoplastic sheet form a seal around the part geometry.

5. The female mold vacuum forming apparatus of claim 4 wherein said plug includes a bottom surface adapted to substantially register with the part geometry of the female mold.

6. The female vacuum forming apparatus of claim 1 wherein the clamp is configured to be in a substantially horizontal plane.

7. A female mold vacuum forming apparatus comprising:
   a mold having side walls and a bottom wall defining a cavity and a cavity surface containing air canals, said cavity surface defining part geometry having deep draw sections,
   wherein at least one open section is defined in a side wall of the mold adjacent to at least one deep draw section to allow unhindered formation of parts within said at least one deep-draw section, said at least on open section defining a non-molding region of said cavity, said at least one open section defines a depth that is at least one third the depth of the adjacent at least on deep-draw section.

8. The female mold vacuum forming apparatus of claim 7 wherein the cavity surface is made of a porous material.

9. The female mold vacuum forming apparatus of claim 7 wherein said at least one deep draw section has a depth greater than the length of half the longer width of the cavity.

10. The female mold vacuum forming apparatus of claim 7 further comprising a plug adapted to engage a thermoplastic sheet around said part geometry, wherein during operation the plug, the female mold and the thermoplastic sheet form a seal around the part geometry.

11. The female mold vacuum forming apparatus of claim 10 wherein said plug includes a bottom surface adapted to substantially register with the part geometry of the female mold.

12. The female vacuum forming apparatus of claim 10 further comprising a clamp for holding the thermoplastic sheet.

13. The female vacuum forming apparatus of claim 12 wherein the clamp is configured to be in a substantially horizontal plane.

14. A vacuum forming apparatus comprising:
   a female mold having a top contoured surface,
   a cavity formed within the top contoured surface, said cavity having a cavity surface, said cavity surface containing air canals, said cavity surface defining part geometry having deep draw sections, a plug adapted to engage a thermoplastic sheet around said part geometry, wherein during operation the plug, the female mold and the thermoplastic sheet form a seal around the part geometry, said top contoured surface and said plug, when engaged with the sheet around the part geometry, define open sections in the side surfaces of the mold adjacent to at least one of said deep-draw sections to allow free formation of parts within at least one of said deep-draw sections.

* * * * *

UNITED STATES PATENT AND TRADEMARK OFFICE
CERTIFICATE OF CORRECTION

PATENT NO. : 6,793,478 B2
DATED : September 21, 2004
INVENTOR(S) : Frederick J. Homburg, Jr. et al.

It is certified that error appears in the above-identified patent and that said Letters Patent is hereby corrected as shown below:

Column 4,
Line 38, delete "on open" and substitute -- one open -- in its place.

Signed and Sealed this

Thirty-first Day of May, 2005

JON W. DUDAS
*Director of the United States Patent and Trademark Office*